US008899606B2

(12) United States Patent
Cocalis (10) Patent No.: US 8,899,606 B2
(45) Date of Patent: Dec. 2, 2014

(54) REMOVABLE DROPOUTS FOR BICYCLE FRAME

(71) Applicant: Chris Cocalis, Phoenix, AZ (US)

(72) Inventor: Chris Cocalis, Phoenix, AZ (US)

(*) Notice: Subject to any disclaimer, the term of this patent is extended or adjusted under 35 U.S.C. 154(b) by 0 days.

(21) Appl. No.: 13/949,121

(22) Filed: Jul. 23, 2013

(65) Prior Publication Data

US 2014/0054873 A1    Feb. 27, 2014

Related U.S. Application Data

(60) Provisional application No. 61/675,153, filed on Jul. 24, 2012.

(51) Int. Cl.
*B62K 25/02* (2006.01)
*B62K 3/02* (2006.01)
*B62K 19/24* (2006.01)

(52) U.S. Cl.
CPC . *B62K 3/02* (2013.01); *B62K 19/24* (2013.01); *B62K 25/02* (2013.01)
USPC ...... 280/281.1; 280/287; 280/288; 280/288.4

(58) Field of Classification Search
CPC .......... B62K 3/02; B62K 25/00; B62K 25/02; B62K 25/04
USPC ............................ 280/281.1, 287, 288, 288.4
See application file for complete search history.

(56) References Cited

U.S. PATENT DOCUMENTS

| | | | | |
|---|---|---|---|---|
| 5,020,819 | A * | 6/1991 | D'Aluisio et al. | 280/288 |
| 5,076,601 | A * | 12/1991 | Duplessis | 280/281.1 |
| 5,082,303 | A * | 1/1992 | Duehring et al. | 280/288 |
| 5,096,215 | A * | 3/1992 | Chonan | 280/284 |
| 8,087,686 | B1 * | 1/2012 | Carroll et al. | 280/288 |
| 8,424,894 | B2 * | 4/2013 | Cleveland | 280/284 |
| 8,740,239 | B2 * | 6/2014 | Lumpkin | 280/288 |
| 2011/0042917 | A1 * | 2/2011 | Cleveland | 280/288 |
| 2012/0274042 | A1 * | 11/2012 | Harris et al. | 280/288 |

* cited by examiner

*Primary Examiner* — Kevin Hurley
*Assistant Examiner* — Michael Stabley
(74) *Attorney, Agent, or Firm* — Robert A. Parsons; Michael W. Goltry; Parsons & Goltry (57) ABSTRACT

A bicycle frame with removable dropouts includes a bicycle frame having a left seat stay and a left chain stay joined at a left junction, and a right seat stay and a right chain stay joined at a right junction. A left dropout is removably connected to the bicycle frame at the left junction, the left dropout including a body defining an opening for receiving a rear wheel. A right dropout is removably connected to the bicycle frame at the right junction, the right dropout including a body defining an opening for receiving the rear wheel.

16 Claims, 9 Drawing Sheets

REMOVABLE DROPOUTS FOR BICYCLE FRAME

CROSS-REFERENCE TO RELATED APPLICATION

This application claims the benefit of U.S. Provisional Patent Application No. 61/675,153, filed 24 Jul. 2012.

FIELD OF THE INVENTION

This invention relates to bicycles.

More particularly, the present invention relates to dropouts for bicycle frames.

BACKGROUND OF THE INVENTION

The rear wheel of a bicycle is typically attached to the frame by dropouts that removably receive the rear wheel. These dropouts are typically fabricated with the frame as a unitary or one-piece body. If the dropouts are formed of a material different than the frame, such as when a frame is fabricated of carbon fiber or the like, the dropouts are permanently affixed to the frame such as by being incorporated into the structure during manufacture, welding, adhesive or the like.

Bicycles can be generally categorized into two main groups for the purpose of this disclosure, those with multiple gears and those with a single gear. These two categories of bicycles require specific structures to accommodate the different mechanical structures found in each. Specifically, in a single gear bicycle, the chain is maintained at a specific tension. With a permanent dropout, there is no problem, since the dropout is immovable and a chain of the appropriate length for the desired tension can be employed. However, for multiple gear bicycles, the tension on a chain having the same length can vary, depending on the gear employed. Thus, multiple gear bicycles employ a chain tensioner or derailleur.

While each of these works perfectly adequately for its intended purpose, the frames of each cannot be used interchangeably since the requirements of each are different. In other words, the frame of a single gear bicycle cannot be used as a multiple gear bicycle and visa versa. This problem has not been adequately addressed in the bicycle industry.

It would be highly advantageous, therefore, to remedy the foregoing and other deficiencies inherent in the prior art.

An object of the present invention is to provide a frame which can be used as a multiple gear bicycle or a single gear bicycle.

Another object of the present invention is to provide a bicycle frame having interchangeable dropout sets for single gear bicycles or multiple gear bicycles.

SUMMARY OF THE INVENTION

Briefly, to achieve the desired objects and advantages of the present invention, provided is a bicycle frame with removable dropouts. The bicycle frame with removable dropouts includes a bicycle frame having a left seat stay and a left chain stay joined at a left junction, and a right seat stay and a right chain stay joined at a right junction. A left dropout is removably connected to the bicycle frame at the left junction. The left dropout includes a body defining an opening for receiving a rear wheel. A right dropout is removably connected to the bicycle frame at the right junction. The right dropout includes a body defining an opening for receiving the rear wheel.

The left dropout is removably connected to the frame by fasteners having a loosened state allowing pivoting of the body of the left dropout relative the frame to adjust the position of the opening for receiving the rear wheel relative the frame, and a tightened state securely immovably fixing the body of the left dropout relative the frame. The right dropout is removably connected to the frame by fasteners having a loosened state allowing pivoting of the body of the right dropout relative the frame to adjust the position of the opening for receiving the rear wheel relative the frame, and a tightened state securely immovably fixing the body of the right dropout relative the frame.

A left adjustment mechanism of the left dropout includes an adjustment screw having a head end, a distal end and a plurality of longitudinally extending and spaced apart flutes. The adjustment screw is threaded through threaded flanges extending from the body with the distal end engaging the left chain stay whereby tightening or loosening the adjustment screw incrementally pivots the body of the left dropout with the fasteners in the loosened state. The right adjustment mechanism of the right dropout includes an adjustment screw having a head end, a distal end and a plurality of longitudinally extending and spaced apart flutes. The adjustment screw is threaded through threaded flanges extending from the body with the distal end engaging the right chain stay whereby tightening or loosening the adjustment screw incrementally pivots the body of the right dropout with the fasteners in the loosened state.

A detent assembly includes a threaded tube inserted through the body perpendicular to the adjustment screw. A detent member is carried by the threaded tube, and a biasing member biases the detent member into an adjacent one of the flutes of the adjustment screw. The pressure exerted by the biasing member can be adjusted by a depth of the threaded tube inserted into the body. Turning of the adjustment screw adjusts the position of the body relative the frame in increments measured by the detent member entering and leaving adjacent flutes as the adjustment screw is turned.

In a further aspect of the invention, provided is a bicycle frame with two sets of removable dropouts. The bicycle frame includes a left seat stay and a left chain stay joined at a left junction, and a right seat stay and a right chain stay joined at a right junction. A set of adjustable dropouts includes a left adjustable dropout having a body defining an opening for receiving a rear wheel and a left adjustment mechanism. The left adjustable dropout is adjustably and removably connectable to the frame by fasteners having a loosened state allowing pivoting of the body of the left adjustable dropout relative the frame to adjust the position of the opening for receiving the rear wheel relative the frame, and a tightened state securely immovably fixing the body of the left adjustable dropout relative the frame. Also provided is a right adjustable dropout including a body defining an opening for receiving a rear wheel and a right adjustment mechanism. The right adjustable dropout is adjustably and removably connectable to the frame by fasteners having a loosened state allowing pivoting of the body of the right adjustable dropout relative the frame to adjust the position of the opening for receiving the rear wheel relative the frame, and a tightened state securely immovably fixing the body of the right adjustable dropout relative the frame.

Also provided is a set of fixed dropouts including a left fixed dropout and a right fixed dropout. The left fixed dropout is removably connectable to the frame by fasteners securely and immovably fixing the body of the left fixed dropout relative the frame. The right fixed dropout is removably connectable to the frame by fasteners securely and immovably fixing the body of the right fixed dropout relative the frame, and including a removable derailleur hanger coupled to and extending therefrom. The set of adjustable dropouts are interchangeably coupled to the frame with the set of fixed dropouts.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

Figure 1:
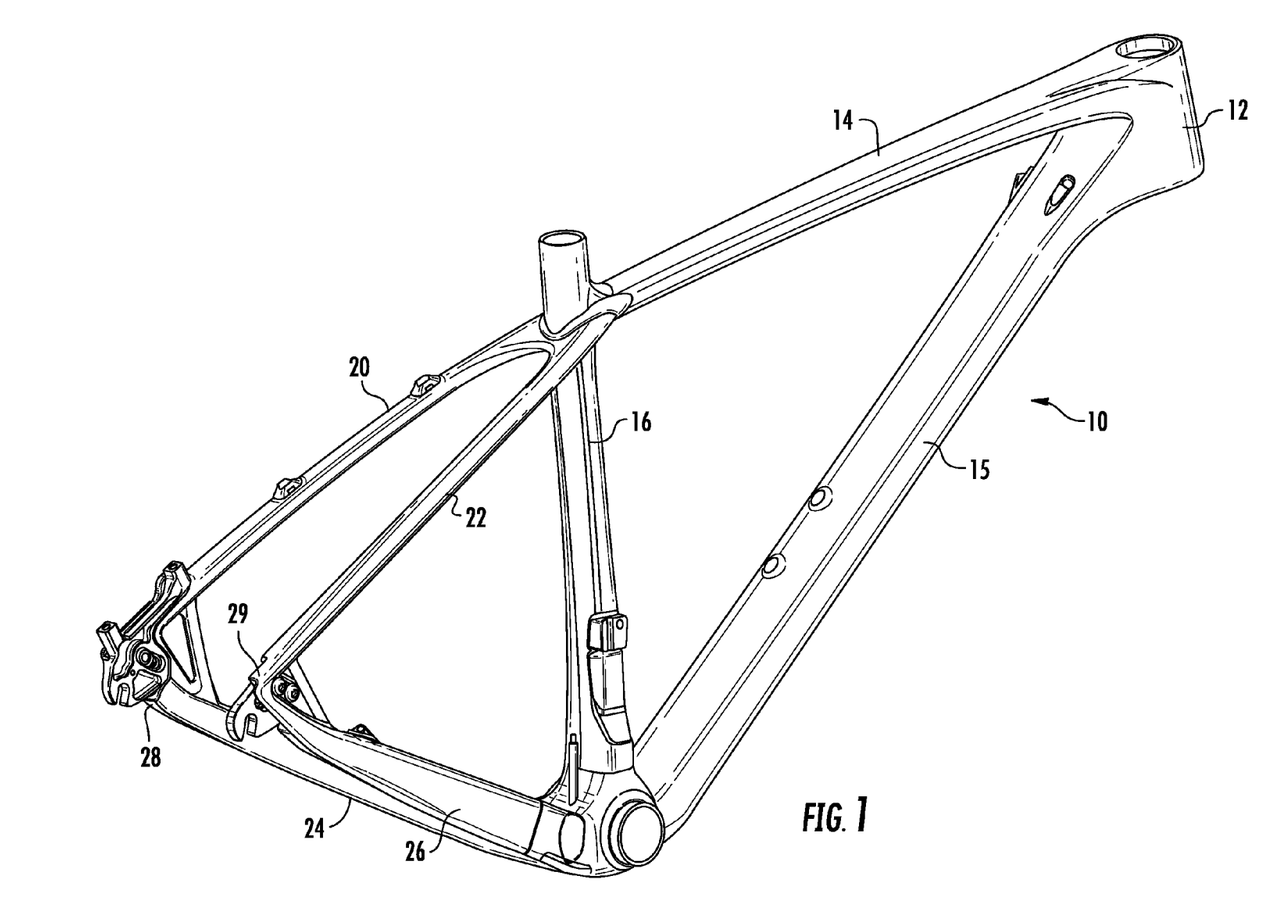
FIG. 1 is a perspective side view of a bicycle frame with removable adjustable dropouts according to the present invention.

Turning now to the drawings in which like reference characters indicate corresponding elements throughout the several views, attention is directed to FIG. 1 which illustrates a bicycle frame generally designated 10. Frame 10 includes a head tube 12 with a top tube 14 and a down tube 15 each extending therefrom. A seat tube 16 extends between the ends of top tube 14 and down tube 15 forming a conventional triangular frame. Left and right seat stays 20 and 22, respectively, extend rearwardly from the juncture of top tube 14 and seat tube 16. Left and right chain stays 24 and 26, respectively, extend rearwardly from the juncture of down tube 15 and seat tube 16. Left seat stay 20 and Left chain stay 24 form a juncture 28 at their distal ends rearward of seat tube 16 and right seat stay 22 and right chain stay 26 form a juncture 29 at their distal ends rearward of seat tube 16. It should be understood that for purposes of this description, the rearward direction is a direction from head tube 12 toward seat tube 16, the forward direction is a direction from seat tube 16 toward head tube 12, the left and right sides of frame 10 are determined when facing in the forward direction.

Figure 2:
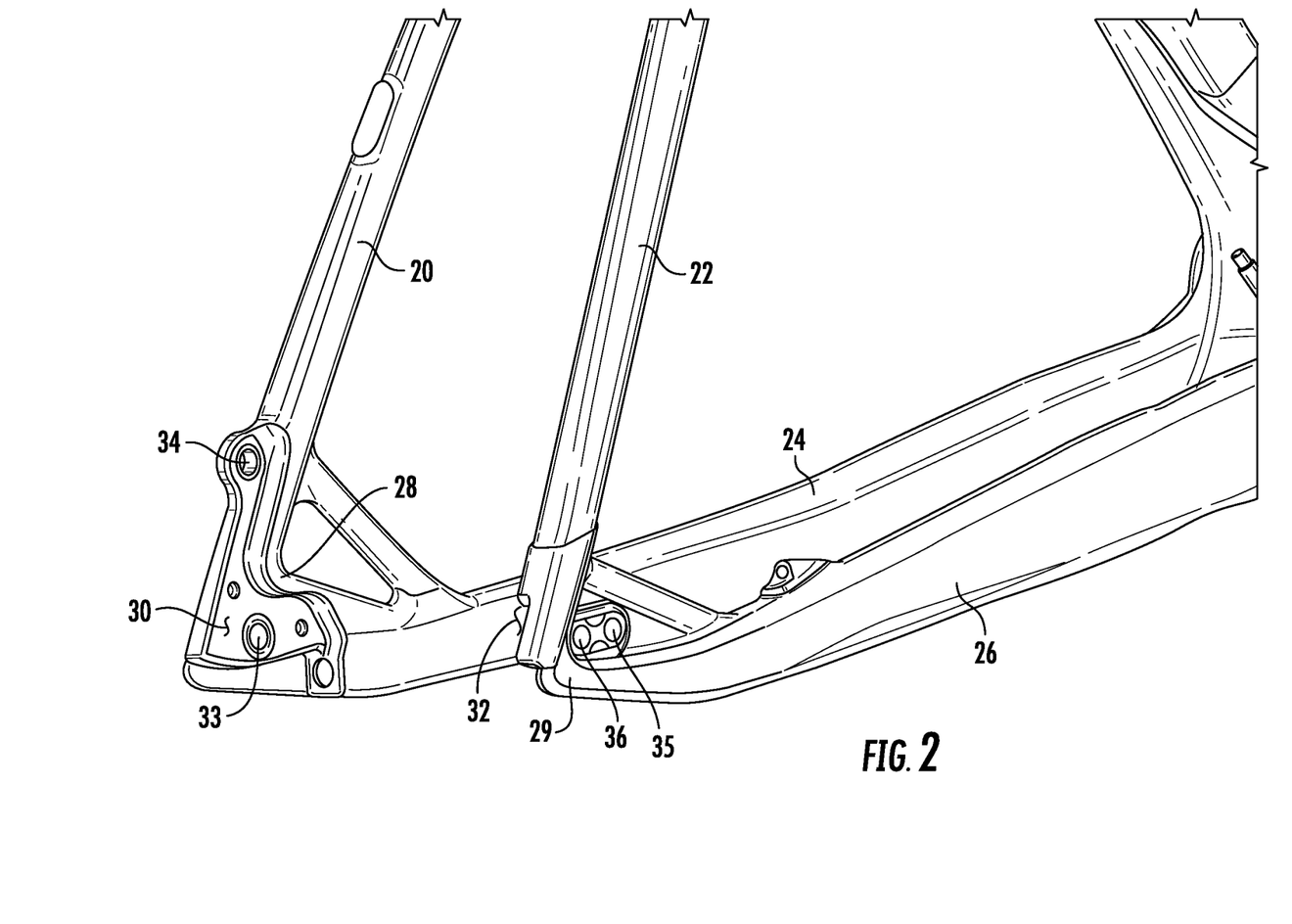
FIG. 2 is an enlarged perspective view of a rear portion of the frame showing cut-outs for receiving removable dropouts.

With additional reference to FIG. 2, a left cut-out 30 and a right cut-out 32 are formed in junctions 28 and 29, respectively. Cut-outs 30 and 32 are positioned generally where conventional dropouts or fork ends are formed in the frame. Cut-out 30 includes aperture 33 and eyelet 34, and cut-out 32 includes apertures 35 and 36. Dropouts are a type of fork end on the frame of a bicycle which receives a wheel. In the present invention, removable dropouts and fork ends are interchangeably receivable by cut-outs 30 and 32. As will be described presently, removable adjustable dropouts and removable fixed dropouts are provided. As will become clear presently, removable adjustable dropouts are used when a single gear bicycle is desired, and removable fixed dropouts are employed when multiple gears are desired. It will be understood that the term "removable" means the parts are joined in such a manner as to be readily separable. Readily separable meaning that the can be removed without damaging or compromising the parts, and this can be accomplished repeatedly and easily.

Figure 3:
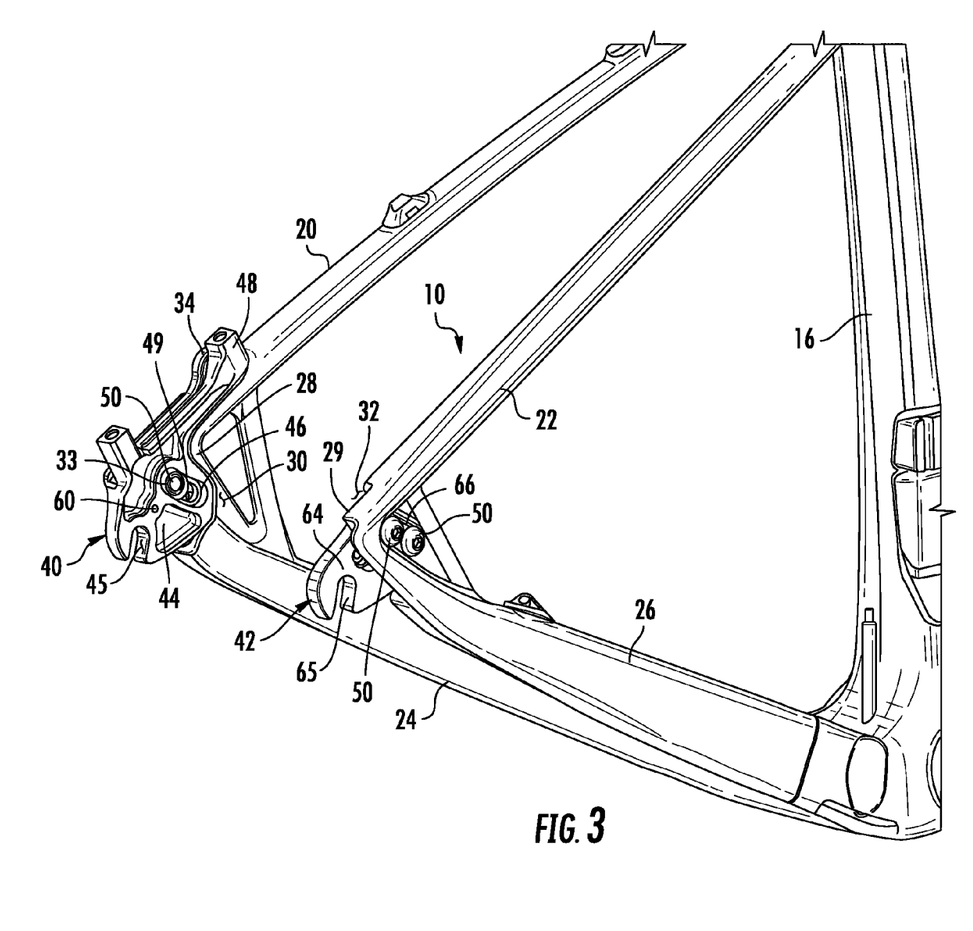
FIG. 3 is an enlarged perspective view of a rear portion of the frame from the right side, with removable adjustable dropouts.
Figure 4:
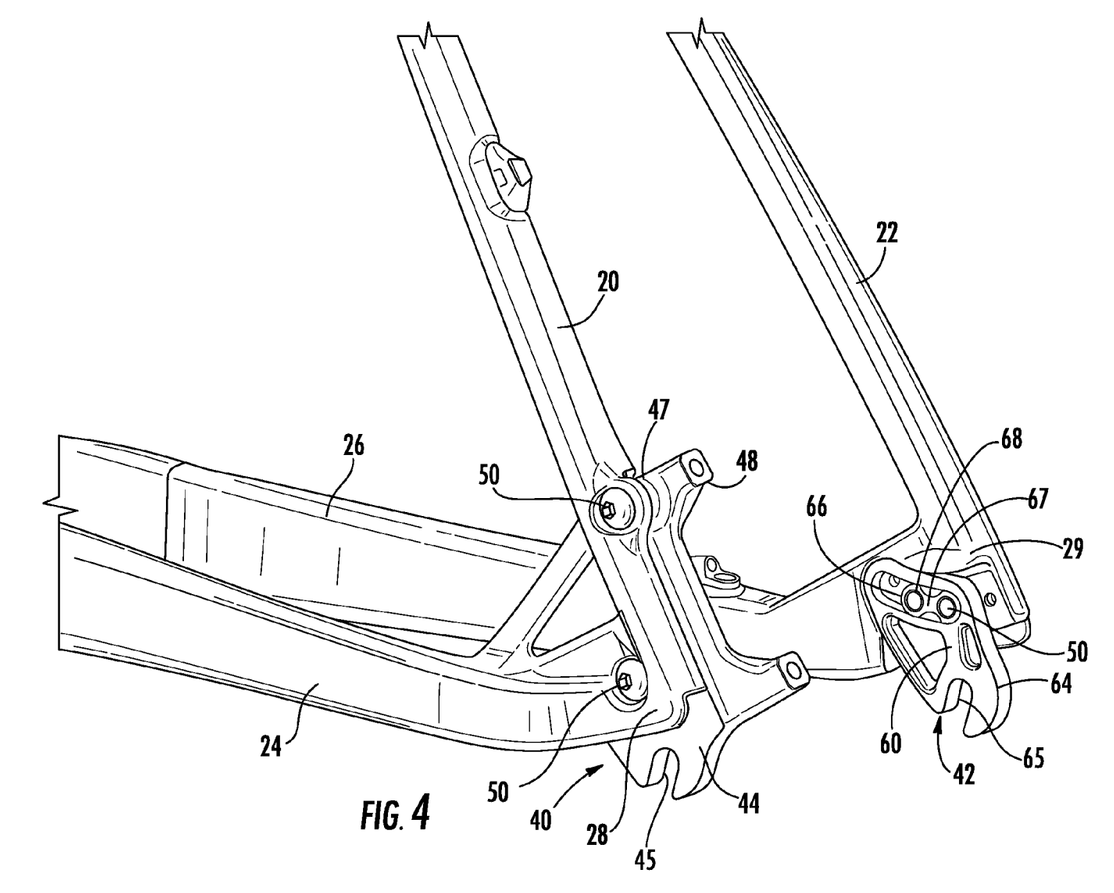
FIG. 4 is an enlarged perspective view of a rear portion of the frame from the left side, with removable adjustable dropouts.
Figure 5:
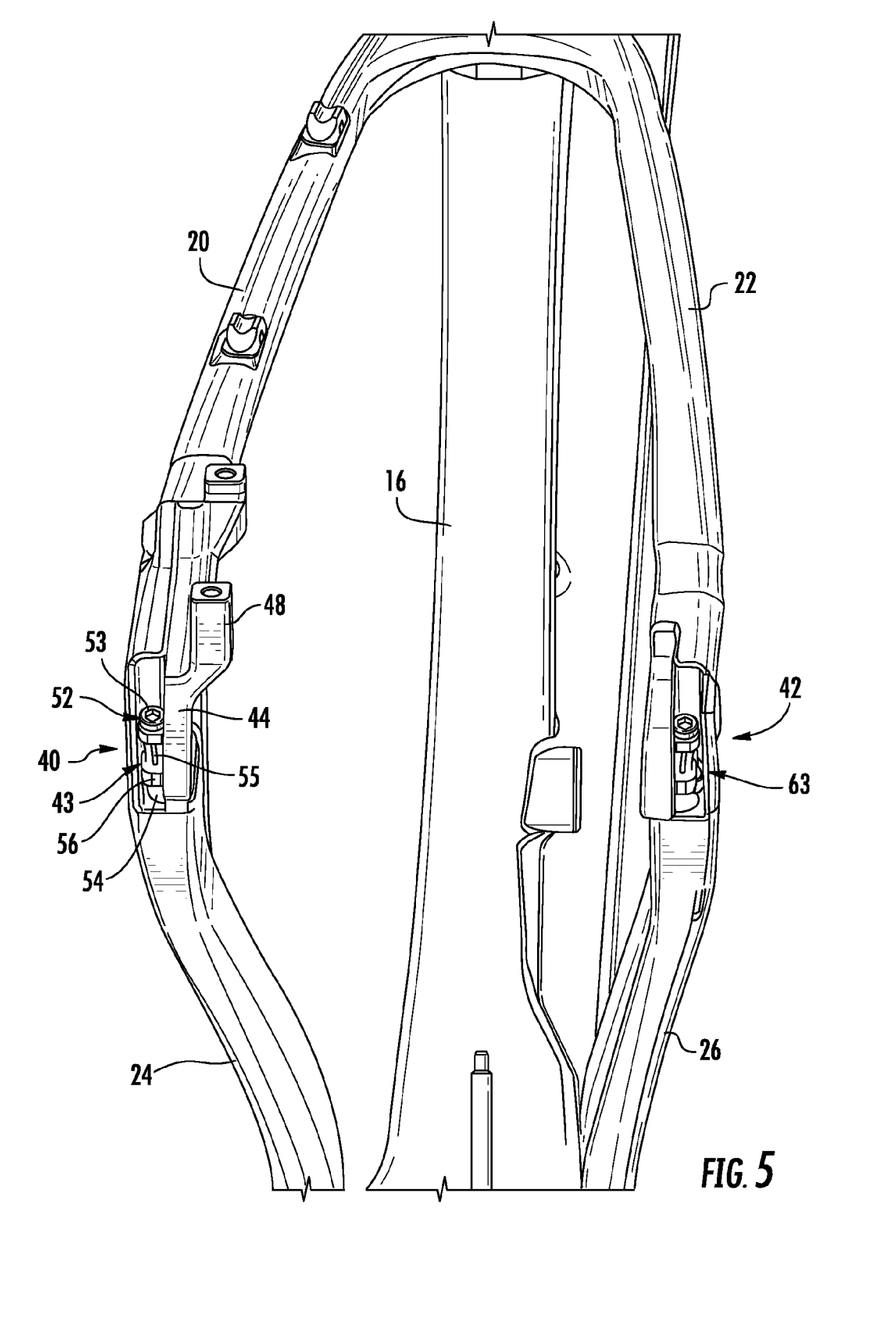
FIG. 5 is an enlarged perspective bottom view of a rear portion of the frame, with removable adjustable dropouts.

Turning now to FIGS. 3 and 4, bicycle frame 10 is illustrated with a left removable adjustable dropout 40 and a right removable adjustable dropout 42 positioned and coupled within cut-outs 30 and 32, respectively. Left removable adjustable dropout 40 includes a body 44, and an adjustment mechanism 43 (FIG. 5). Body 44 defines a generally downwardly directed vertical slot 45 for receiving a wheel with quick release fastener (not shown), a slot 46, a threaded aperture 47 and a brake bracket 48 for receiving brake components (not shown). It will be understood that while a slot 45 is employed in this embodiment, other openings can be employed for receiving a wheel, such as threaded apertures, smooth apertures, slots altered in direction and the like. Body 44 is fastened to frame 10 within cut-out 30 by fastening members such as a screw 50 passing through aperture 33 into slot 46 and threading into a clamp member 49 slidably retained within slot 46 and a screw 50 passing through eyelet 34 into threaded aperture 47. Tightening screw 50 securely retains body 44 in position. When screws 50 are loosened, body 44 can be pivoted about screw 50 in eyelet 34, positioning slot 45 further forward or rearward to adjust chain tension. This is important in a single gear bicycle since there is no chain tensioner or derailleur.

Figure 6:
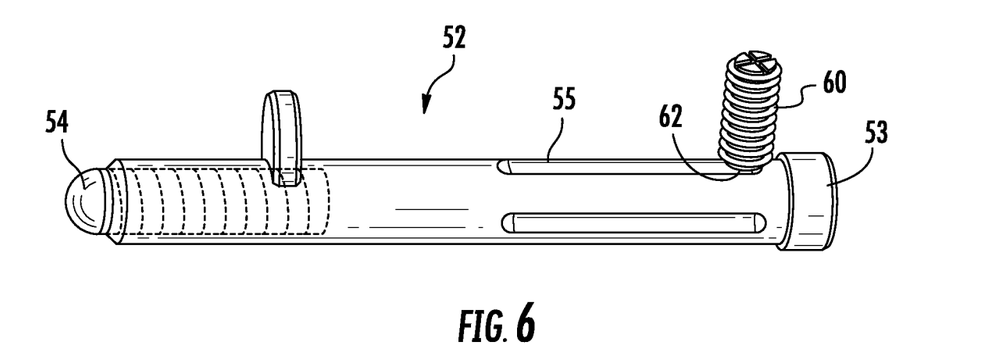
FIG. 6 is an enlarged perspective view of the adjustment mechanism according to the present invention.

With additional reference to FIGS. 5 and 6, adjustment mechanism 43 can be seen. Adjustment mechanism 43 includes an adjustment screw 52 having a head end 53, a distal end 54 and a plurality of longitudinally extending and spaced apart flutes 55. Adjustment screw 52 is threaded through threaded flanges 56 extending from body 44 with distal end 54 engaging chain stay 24. By tightening or loosening adjustment screw 52, body 44 is pivoted about screw 50 in eyelet 34 when screws 50 are in a loosened state for purposes described previously.

Figure 9:
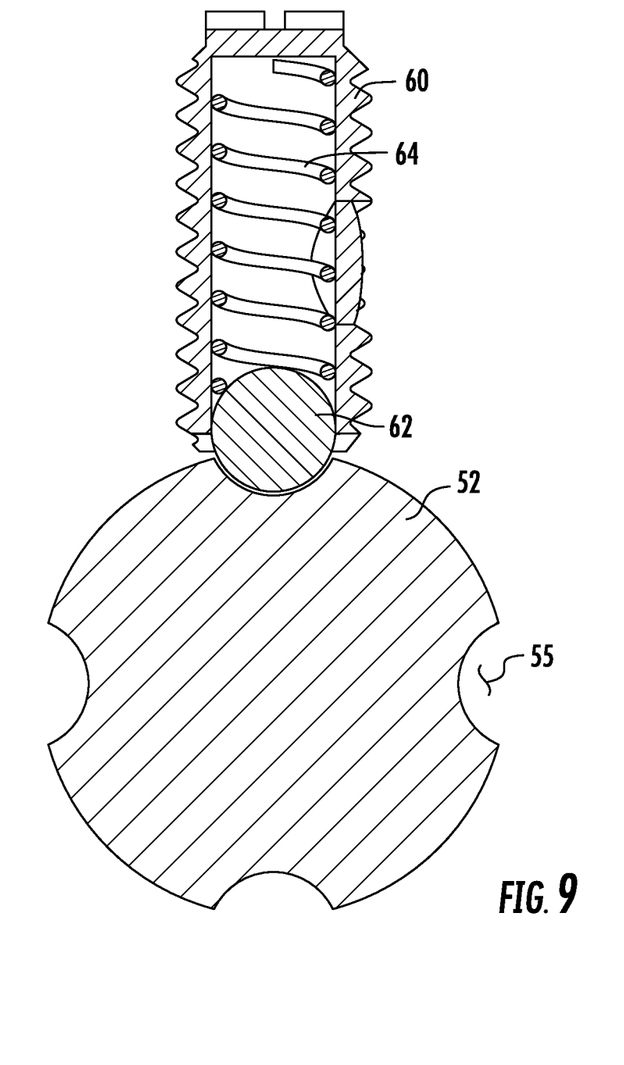
FIG. 9 is a sectional view of an adjustment mechanism.

With additional reference to FIGS. 6 and 9, a detent assembly includes a threaded tube 60 inserted through body 44 perpendicular to screw 52. Threaded tube 60 carries a ball 62 or like structure biased by a spring 64 into an adjacent one of flutes 55 acting as an indent. The pressure exerted by the bias of spring 64 can be adjusted by the depth tube 60 is inserted into body 44. As adjustment screw 52 is turned to adjust body 44, the distance can be counted in "clicks" caused by the ball entering and leaving flutes 55. In this manner the precise adjustment can be determined and applied to dropout 42 as will be seen presently. In other words, the angle of slot 45 can be determined by the number of clicks. Additionally, the detent assembly prevents screw 52 from changing its adjustment position and prevents screw 52 from backing out of its position through vibration and the like.

Still referring to FIGS. 3 and 4, right removable adjustable dropout 42 includes a body 64, and an adjustment mechanism 63 (FIG. 5). Body 64 defines a generally downwardly directed vertical slot 65 for receiving a wheel with quick release fastener (not shown), a slot 66, and a clamp member 67 having threaded apertures 68. It will be understood that while a slot 65 is employed in this embodiment, other openings can be employed for receiving a wheel, such as threaded apertures, smooth apertures, slots altered in direction and the like. Body 64 is fastened to frame 10 within cut-out 32 by fastening members such as screws 50 passing through apertures 35 and 36 into threaded apertures 68 of clamp member 67. Tightening screws 50 clamps clamp member 67 immovably within slot 65, securely retaining body 64 in position. When screws 50 are loosened, body 64 can be moved by the sliding movement of clamp member 67 within slot 66, positioning slot 65 further forward or rearward to adjust chain tension. This is important in a single gear bicycle since there is no chain tensioner or derailleur.

With additional reference to FIG. 5, adjustment mechanism 63 can be seen. Adjustment mechanism 63 is identical to adjustment mechanism 43 and operates in the same manner. When either adjustment mechanism 43 or 63 is adjusted a specific number of "clicks", the other of adjustment mechanism 43 and 63 can be adjusted identically by using the same number of "clicks". Thus identical adjustment is ensured.

Figure 7:
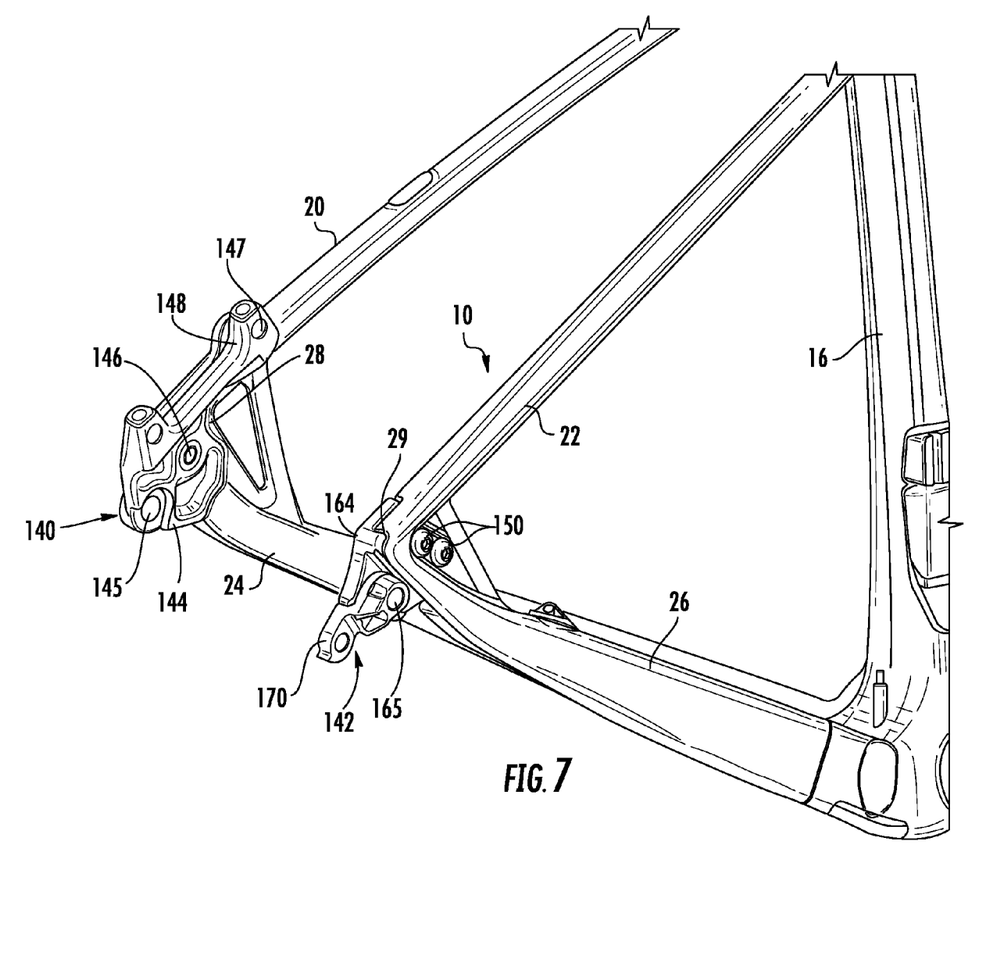
FIG. 7 is an enlarged perspective view of a rear portion of the frame from the right side, with removable fixed dropouts.
Figure 8:
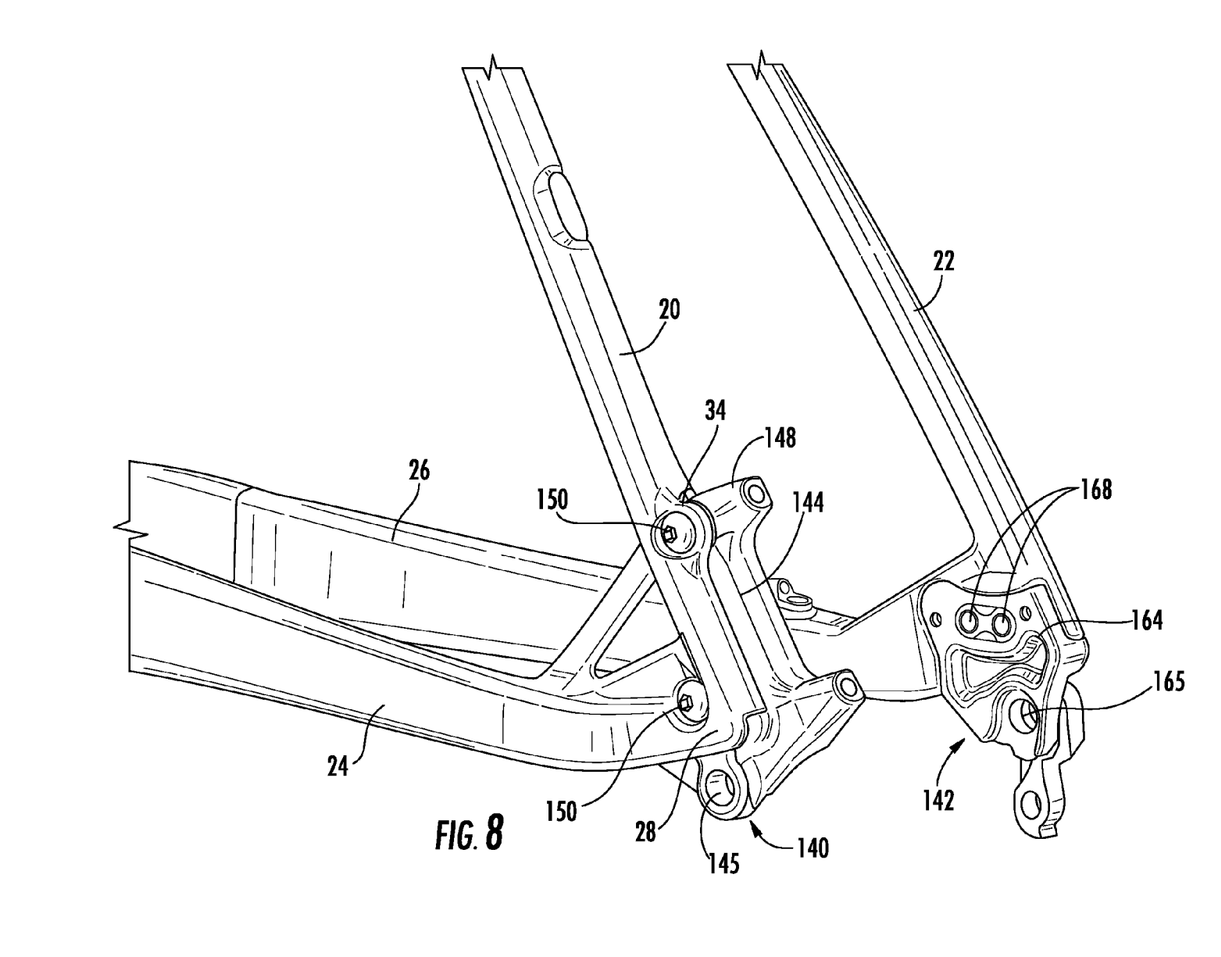
FIG. 8 is an enlarged perspective view of a rear portion of the frame from the left side, with removable fixed dropouts.

Turning now to FIGS. 7 and 8, frame 10 can be modified from a single gear bicycle, as described previously, to a multi-gear bicycle by removing adjustable dropouts 40 and 42 and substituting therefore left fixed dropout 140 and right fixed dropout 142. Left removable fixed dropout 140 includes a body 144 but has no need of an adjustment mechanism. Body 144 can define a generally downwardly directed vertical slot as in body 44, but in this preferred embodiment defines an aperture 145 for receiving a wheel having a through axle design well known in the art, a threaded aperture 146, a threaded aperture 147 and a brake bracket 148 for receiving brake components (not shown). Body 144 is fastened to frame 10 within cut-out 30 by fastening members such as a screw 150 passing through aperture 33 into threaded aperture 146 and a screw 150 passing through eyelet 34 into threaded aperture 147. Tightening screw 150 securely retains body 144 in position. Left fixed dropout 140 is not adjustable as a multi-gear bicycle has a chain tensioner or derailleur.

Still referring to FIGS. 7 and 8, right removable fixed dropout 142 includes a body 164 and does not require an adjustment mechanism. Body 164 can define a generally downwardly directed vertical slot as in body 44, but in this preferred embodiment defines an aperture 165 for receiving a wheel having a through axle design well known in the art, and threaded apertures 168. Body 164 is fastened to frame 10 within cut-out 32 by fastening members such as screws 150 passing through apertures 35 and 36 into threaded apertures 168. Tightening screws 160 securely retains body 164 in position. Right fixed dropout 142 is not adjustable as a multi-gear bicycle has a chain tensioner or derailleur as evidenced by a removable derailleur hanger 170 coupled to and extending from right fixed dropout 142.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

The invention claimed is:

1. A bicycle frame with removable dropouts comprising:
a bicycle frame including a left seat stay and a left chain stay joined at a left junction, and a right seat stay and a right chain stay joined at a right junction;
a left dropout removably connected to the bicycle frame at the left junction, the left dropout including a body defining an opening for receiving a rear wheel;
a right dropout removably connected to the bicycle frame at the right junction, the right dropout including a body defining an opening for receiving the rear wheel;
the left dropout removably connected to the frame by fasteners having a loosened state allowing pivoting of the body of the left dropout relative the frame to adjust the position of the opening for receiving the rear wheel relative the frame, and a tightened state securely immovably fixing the body of the left dropout relative the frame, and further includes a left adjustment mechanism; and
the right dropout removably connected to the frame by fasteners having a loosened state allowing pivoting of the body of the right dropout relative the frame to adjust the position of the opening for receiving the rear wheel relative the frame, and a tightened state securely immovably fixing the body of the right dropout relative the frame, and further includes a right adjustment mechanism.

2. A bicycle frame with removable dropouts as claimed in claim 1 further comprising:
the left adjustment mechanism including an adjustment screw having a head end, a distal end and a plurality of longitudinally extending and spaced apart flutes, the adjustment screw is threaded through threaded flanges extending from the body with the distal end engaging the left chain stay whereby tightening or loosening the adjustment screw incrementally pivots the body of the left dropout with the fasteners in the loosened state; and
the right adjustment mechanism including an adjustment screw having a head end, a distal end and a plurality of longitudinally extending and spaced apart flutes, the adjustment screw is threaded through threaded flanges extending from the body with the distal end engaging the right chain stay whereby tightening or loosening the adjustment screw incrementally pivots the body of the right dropout with the fasteners in the loosened state.

3. A bicycle frame with removable dropouts as claimed in claim 2 wherein the left adjustment mechanism and the right adjustment mechanism each further include a detent assembly comprising:
a threaded tube inserted through the body perpendicular to the adjustment screw;
a detent member carried by the threaded tube;
a biasing member biasing the detent member into an adjacent one of the flutes of the adjustment screw, whereby the pressure exerted by the biasing member can be adjusted by a depth of the threaded tube inserted into the body, and whereby the turning of the adjustment screw adjusts the position of the body relative the frame in increments measured by the detent member entering and leaving adjacent flutes as the adjustment screw is turned.

4. A bicycle frame with removable dropouts as claimed in claim 1 further comprising:
a left cut-out defined by the left junction for receiving the left dropout; and
a right cut-out defined by the right junction for receiving the right dropout.

5. A bicycle frame with removable dropouts as claimed in claim 4 further comprising:
an aperture defined through the left cut-out;
a slot defined through the body of the left dropout;

the body of the left dropout fastened to the frame within the left cut-out by the fasteners passing through the aperture into the slot and threading into a clamp member slidably retained within the slot.

6. A bicycle frame with removable dropouts as claimed in claim 4 further comprising:
an aperture defined through the right cut-out;
a slot defined through the body of the right dropout;
the body of the right dropout fastened to the frame within the right cut-out by the fasteners passing through the aperture into the slot and threading into a clamp member slidably retained within the slot.

7. A bicycle frame with removable dropouts as claimed in claim 1 wherein the frame further comprises:
a head tube with a top tube and a down tube extending therefrom, and a seat tube extending between an end of the top tube and an end of the down tube forming a triangular frame;
the left seat stay extending rearwardly from a juncture of the top tube and the seat tube;
the right seat stay extending rearwardly from a juncture of the top tube and the seat tube;
the right chain stay extending rearwardly from a juncture of the down tube and the seat tube;
the left chain stay extending rearwardly from a juncture of the down tube and the seat tube;
the left seat stay and left chain stay are joined to form the left juncture at their distal ends rearward of seat tube; and
the right seat stay and the right chain stay are joined to form the right juncture at their distal ends rearward of seat tube.

8. A bicycle frame with removable dropouts comprising:
a bicycle frame including a left seat stay and a left chain stay joined at a left junction, and a right seat stay and a right chain stay joined at a right junction;
a set of adjustable dropouts including:
a left adjustable dropout including a body defining an opening for receiving a rear wheel and a left adjustment mechanism, the left adjustable dropout adjustably and removably connectable to the frame by fasteners having a loosened state allowing pivoting of the body of the left adjustable dropout relative the frame to adjust the position of the opening for receiving the rear wheel relative the frame, and a tightened state securely immovably fixing the body of the left adjustable dropout relative the frame; and
a right adjustable dropout including a body defining an opening for receiving a rear wheel and a right adjustment mechanism, the right adjustable dropout adjustably and removably connectable to the frame by fasteners having a loosened state allowing pivoting of the body of the right adjustable dropout relative the frame to adjust the position of the opening for receiving the rear wheel relative the frame, and a tightened state securely immovably fixing the body of the right adjustable dropout relative the frame;
a set of fixed dropouts including:
a left fixed dropout removably connectable to the frame by fasteners securely and immovably fixing the body of the left fixed dropout relative the frame; and
a right fixed dropout removably connectable to the frame by fasteners securely and immovably fixing the body of the right fixed dropout relative the frame, and including a removable derailleur hanger coupled to and extending therefrom; and
whereby the set of adjustable dropouts are interchangeably coupled to the frame with the set of fixed dropouts.

9. A bicycle frame with removable dropouts as claimed in claim 8 further comprising:
the left adjustment mechanism including an adjustment screw having a head end, a distal end and a plurality of longitudinally extending and spaced apart flutes, the adjustment screw is threaded through threaded flanges extending from the body of the left adjustable dropout with the distal end engaging the left chain stay whereby tightening or loosening the adjustment screw incrementally pivots the body of the left adjustable dropout with the fasteners in the loosened state; and
the right adjustment mechanism including an adjustment screw having a head end, a distal end and a plurality of longitudinally extending and spaced apart flutes, the adjustment screw is threaded through threaded flanges extending from the body of the right adjustable dropout with the distal end engaging the right chain stay whereby tightening or loosening the adjustment screw incrementally pivots the body of the right adjustable dropout with the fasteners in the loosened state.

10. A bicycle frame with removable dropouts as claimed in claim 9 wherein the left adjustment mechanism and the right adjustment mechanism each further include a detent assembly comprising:
a threaded tube inserted through the body perpendicular to the adjustment screw;
a detent member carried by the threaded tube;
a biasing member biasing the detent member into an adjacent one of the flutes of the adjustment screw, whereby the pressure exerted by the biasing member can be adjusted by a depth of the threaded tube inserted into the body, and whereby the turning of the adjustment screw adjusts the position of the body relative the frame in increments measured by the detent member entering and leaving adjacent flutes as the adjustment screw is turned.

11. A bicycle frame with removable dropouts as claimed in claim 8 further comprising:
a left cut-out defined by the left junction for receiving one of the left adjustable dropout and the left fixed dropout; and
a right cut-out defined by the right junction for receiving one of the right adjustable dropout and the right fixed dropout.

12. A bicycle frame with removable dropouts as claimed in claim 11 further comprising:
an aperture defined through the left cut-out;
a slot defined through the body of the left adjustable dropout;
the body of the left adjustable dropout fastened to the frame within the left cut-out by the fasteners passing through the aperture into the slot and threading into a clamp member slidably retained within the slot.

13. A bicycle frame with removable dropouts as claimed in claim 11 further comprising:
an aperture defined through the right cut-out;
a slot defined through the body of the right adjustable dropout;
the body of the right adjustable dropout fastened to the frame within the right cut-out by the fasteners passing through the aperture into the slot and threading into a clamp member slidably retained within the slot.

14. A bicycle frame with removable dropouts as claimed in claim 11 further comprising:
an aperture defined through the left cut-out;

an aperture defined through the body of the left fixed dropout;

the body of the left fixed dropout fastened to the frame within the left cut-out by the fasteners passing through the aperture in the left cut-out into the aperture of the left fixed dropout.

15. A bicycle frame with removable dropouts as claimed in claim 11 further comprising:

an aperture defined through the right cut-out;

an aperture defined through the body of the right fixed dropout;

the body of the right fixed dropout fastened to the frame within the right cut-out by the fasteners passing through the aperture in the right cut-out into the aperture in the right fixed dropout.

16. A bicycle frame with removable dropouts as claimed in claim 8 wherein the frame further comprises:

a head tube with a top tube and a down tube extending therefrom, and a seat tube extending between an end of the top tube and an end of the down tube forming a triangular frame;

the left seat stay extending rearwardly from a juncture of the top tube and the seat tube;

the right seat stay extending rearwardly from a juncture of the top tube and the seat tube;

the right chain stay extending rearwardly from a juncture of the down tube and the seat tube;

the left chain stay extending rearwardly from a juncture of the down tube and the seat tube;

the left seat stay and left chain stay are joined to form the left juncture at their distal ends rearward of seat tube; and the right seat stay and the right chain stay are joined to form the right juncture at their distal ends rearward of seat tube.

\* \* \* \* \*